United States Patent
Meyer et al.

(10) Patent No.: US 7,573,908 B2
(45) Date of Patent: Aug. 11, 2009

(54) DATA UNIT HANDLING DEVICE AND METHOD OF CONTROLLING A DATA UNIT HANDLING DEVICE

(75) Inventors: Michael Meyer, Aachen (DE); Reiner Ludwig, Huertgenwald (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 918 days.

(21) Appl. No.: 10/470,225

(22) PCT Filed: Jan. 22, 2002

(86) PCT No.: PCT/EP02/00591

§ 371 (c)(1),
(2), (4) Date: Jul. 24, 2003

(87) PCT Pub. No.: WO02/060214

PCT Pub. Date: Aug. 1, 2002

(65) Prior Publication Data

US 2004/0052266 A1    Mar. 18, 2004

(30) Foreign Application Priority Data

Jan. 25, 2001    (EP) .................................. 01101617

(51) Int. Cl.
*H04J 3/16*    (2006.01)
*H04J 3/22*    (2006.01)

(52) U.S. Cl. ...................................... 370/469; 370/412

(58) Field of Classification Search ................. 370/394, 370/395.4, 412, 423, 428, 466, 467, 469, 370/903, 912
See application file for complete search history.

(56) References Cited

U.S. PATENT DOCUMENTS

| 5,533,021 | A | 7/1996 | Branstad et al. |
| 6,252,851 | B1 * | 6/2001 | Siu et al. ..................... 370/236 |
| 6,665,754 | B2 * | 12/2003 | Mann ........................... 710/52 |
| 6,760,860 | B1 * | 7/2004 | Fong et al. ..................... 714/4 |
| 6,950,400 | B1 * | 9/2005 | Tran et al. ................... 370/236 |
| 2005/0237994 | A1 * | 10/2005 | Fong et al. .................. 370/349 |

FOREIGN PATENT DOCUMENTS

| WO | WO 9415438 | 7/1994 |
| WO | WO 0077985 | 12/2000 |

OTHER PUBLICATIONS

Yuang M C, et al., "Dynamic Video Playout Smoothing Method for Multimedia Applications" IEEE International Conference cn Communications (ICC), US, New York, IEEE, Jun. 23, 1996, pp. 1365-1369, XP 000625033. ISBN: 0-7803-3251-2.

* cited by examiner

*Primary Examiner*—Kevin C Harper
*Assistant Examiner*—Leon Andrews
(74) *Attorney, Agent, or Firm*—Roger S. Burleigh

(57) ABSTRACT

A first protocol layer (1), when acting as a receiving peer in a communication, paces data units to be released from a buffer (31) to a second protocol layer (2) lying above the first protocol layer (1). The pacing is conducted over a release period T that is longer than the period of time that would occur if all of the data units of a given plurality were released instantly.

29 Claims, 11 Drawing Sheets

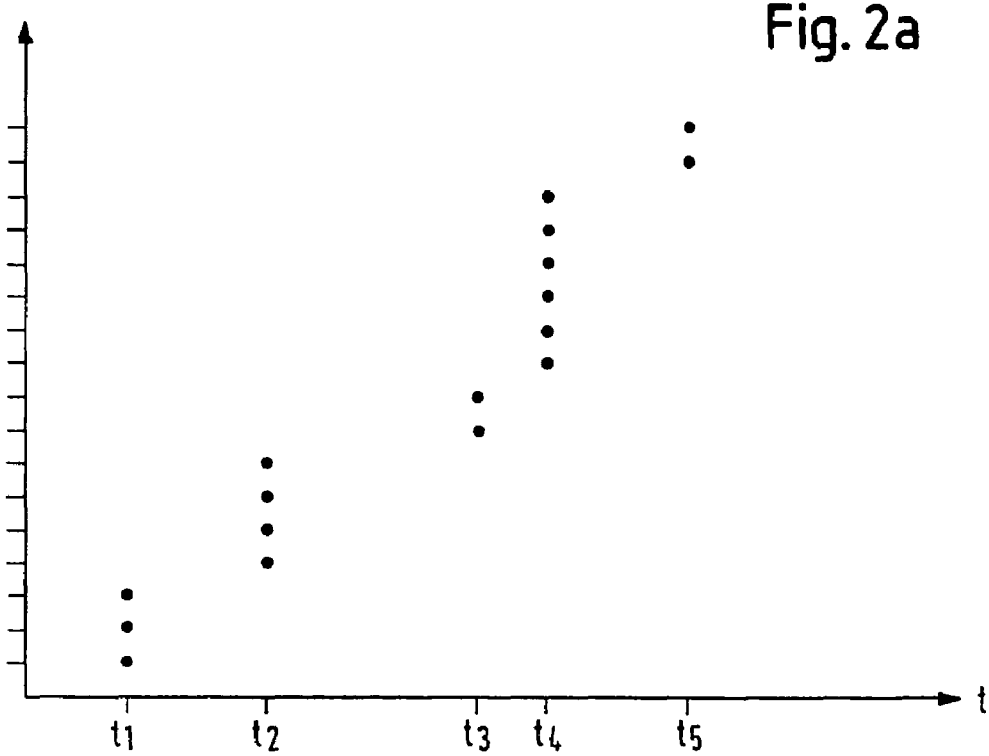
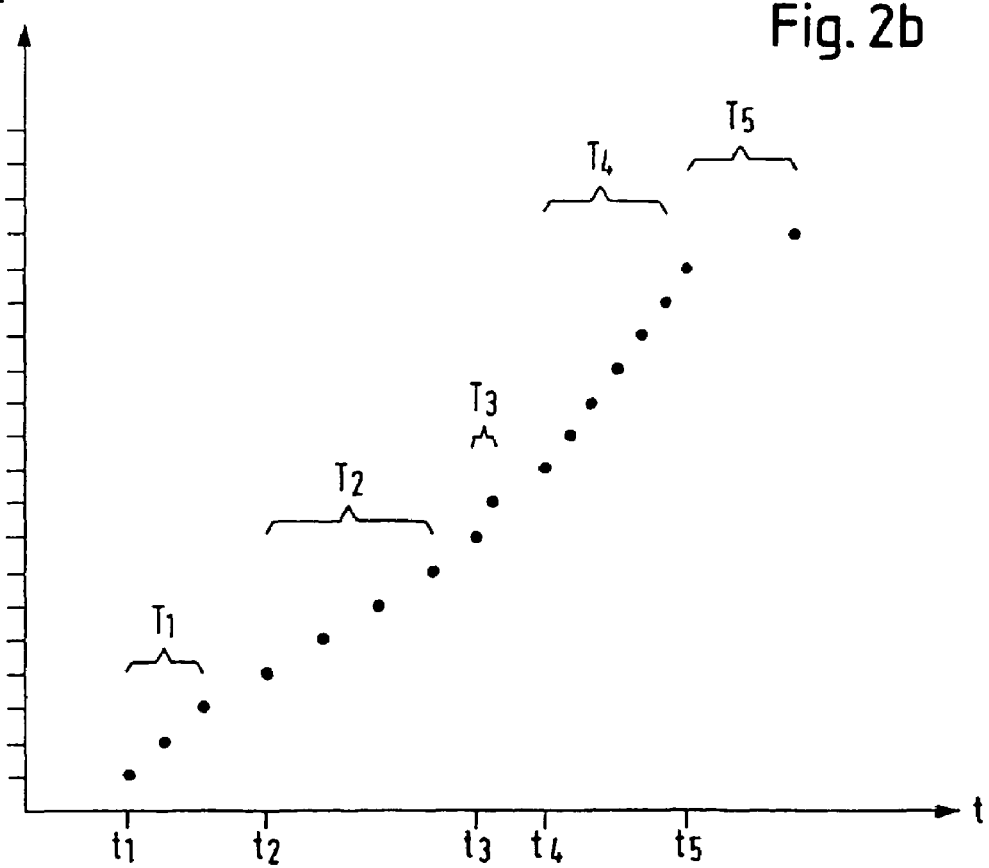

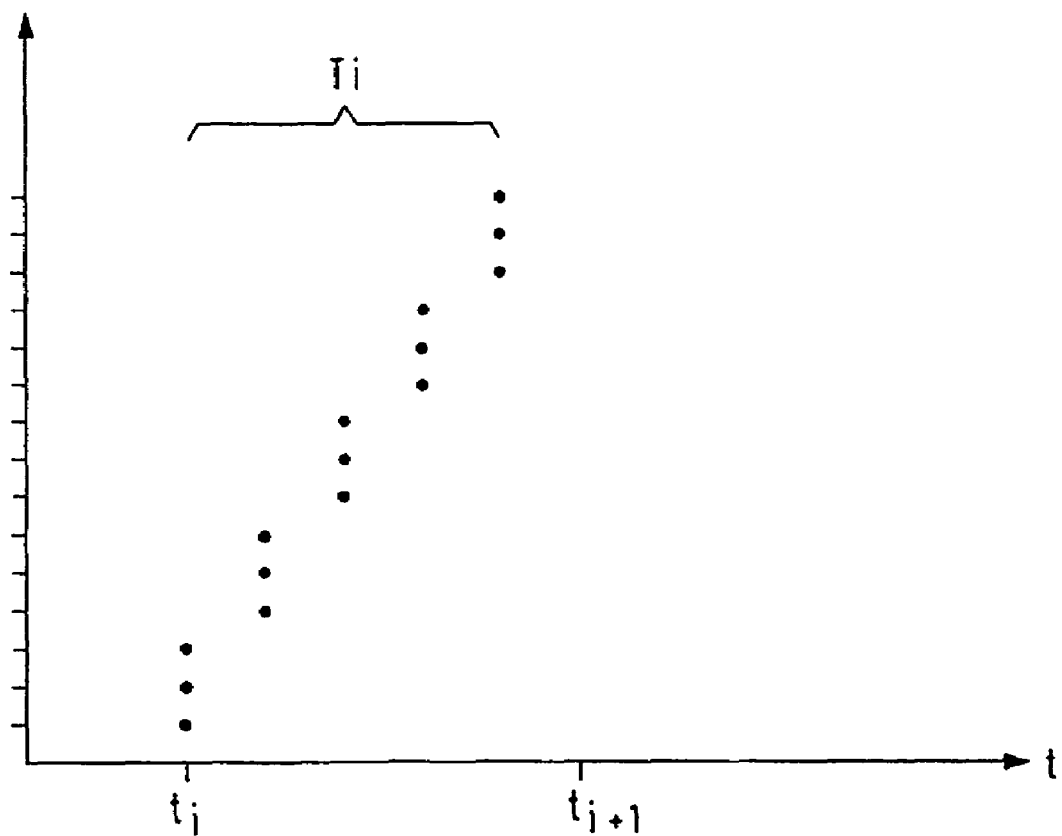

DATA UNIT HANDLING DEVICE AND METHOD OF CONTROLLING A DATA UNIT HANDLING DEVICE

BACKGROUND OF THE INVENTION

The present invention relates to a data unit handling device and a method of controlling a data unit handling device.

In the field of communications the concept of packet based communication is well known. A data packet is a given length of data who's structure is determined by a given protocol, i.e. a set of rules governing the exchange, manipulation and interpretation of such packets. Depending on the protocol, different names are used, such as frame, packet, etc. A more generic term is protocol data unit (PDU), and the following description shall use the term "data unit" for simplicity, where this term "data unit" is to be understood generically as meaning any such finite data carrier, i.e. any packet, frame, etc.

Two implementations of a protocol at two points that exchange data units are also referred to as peers. A communication using data units will typically also employ the concept of layering. Layering means that different protocols are arranged in a hierarchical order, where the sending of data comprises the embedding of data units from higher layer protocols downwards to lower layer protocols, and the action of receiving comprises the opposite operation of reversing the embedding. The term "embedding" generically encompasses both encapsulation as well as segmentation. For example, FIG. 8 shows an example, where a protocol stack consists of implementations of an application layer L5, a transport layer L4, a network layer L3, a link layer L2 and a physical layer L1. In an example communication e.g. the application layer L5 passes down L5 data units (i.e. data units conforming to protocol L5) to the transport layer with L4, which embeds these L5 data units into L4 data units and passes them to the network layer L3, which embeds the L4 data units into L3 data units, etc. In such a communication, each layer shown in FIG. 8 will have a complementary receiving peer.

When the stack shown in FIG. 8 acts as a receiver, then received data units are passed upwards from the lower layers towards the higher layers.

The concepts of data units, protocol stacks, layering, etc. are well known in the art, see e.g. TCP/IP Illustrated, Volume 1, The Protocols, by W. Richard Stevens, Addison-Wesley Long Man, Incorporated, 1994. A further explanation is therefore not necessary here.

SUMMARY OF THE INVENTION

The object of the invention is to provide an improved data unit handling device and improved method of controlling a data unit handling device, where the handling of data units in a layered system acting as a receiver is improved.

This object is solved by a data unit handling device having the features of claim 1 and a method of controlling a data unit handling device having the features of claim 18. Advantageous embodiments are described in the dependent claims.

In accordance with the present invention, in a data unit handling device having a first protocol layer implementation and a second protocol layer implementation, where the second protocol layer lies above the first protocol layer and the first protocol layer is arranged to pass data units upwards towards the second layer when acting as a receiving peer, a buffer controller is operable in such a way that a buffer arranged to release data units to the second layer is controlled to release a plurality of data units (if a plurality of data units stands to be released) over a release period that is longer than the period of time that would occur if all of the data units of the plurality were released instantly. In other words, if a plurality of data units is to be released from a buffer, then it is possible to operate the buffer in such a way that the data units to be released from the buffer are paced out over the mentioned release period.

In this way, it is possible to make the handling of data units more flexible in a layered system acting as a receiver, i.e. when passing data units upwards in a protocol stack. Especially, by pacing out data units that are being handed upwards over a period of time longer than the instantaneous release time can avoid problems caused by bursty release of such plural data units. Namely, in the prior art it is possible that data units being passed upwards in a protocol stack are released in bursts, where such bursts can lead to problems at a higher layer, such as congestion.

The present invention is applicable in any system in which two hierarchical protocol implementations are provided and in which data units released upwards in a receiving system are buffered. For applying the invention, it does not matter why the data units are being buffered. One reason for buffering data units in a receiving peer can e.g. be the requirement of in-order delivery of higher layer data units. Therefore, according to a preferred example, the above described concept is applied to a system where the buffer is arranged to release data units in sequence. In other words, the data units being released upwards have a predetermined order, and the buffer only releases them in that predetermined order. In-order delivery is a very common feature in a number of protocols, e.g. the transmission control protocol (TCP) as known from the TCP/IP suite. In such systems using in-order delivery, it is possible that a number of data units to be released accumulates, because one data unit in the predetermined order is missing (e.g. did not arrive in the receiving peer or was not received correctly), such that all data units following in that predetermined order are held until the missing data unit is correctly received. The reasons for the data unit first going missing and then arriving correctly after a number of other data units have arrived that are later in the sequence, can be many, e.g. this can be due to an retransmission mechanism (such as ARQ) and/or due to data unit reordering. Data unit reordering means that the network transmitting the data units has caused the mentioned data unit to be delayed with respect to other data units that follow in the sequence, e.g. because the delayed data unit is transported over a different physical path to thereby arrive after data units that were sent after this given data unit. Both retransmission mechanisms and data unit reordering are well known, such that further explanations are not necessary.

In a prior art system, the plurality of retained or buffered data units would have been released instantly once the missing data unit was received. In contrast, the present invention proposes a system in which it is possible to pace out the plurality of data units over a period of time longer than the time that would pass if all of the plurality of data units were released instantly.

The invention can be used in any system in which a plurality of data units to be passed upwards is buffered before being released. As already mentioned, with respect to the present invention it does not matter for which reason data units are being buffered, and in-order delivery is only one example. Namely, the present invention can also be used to avoid the instant release of a plurality of data units in the situation where this plurality arrives in one burst at the buffer, coming from a lower layer. In other words, even if the buffer operated in accordance with the invention is not controlled to provide in-order delivery, it is possible that a plurality of releasable data units is present, and the present invention can avoid detrimental effects due to bursty traffic, even if the burstiness is caused by events that are not associated with the buffer itself.

According to the present invention, the buffer controller is operable to control the release of the data units over a release period longer than the amount of time for instant release. This means that the buffer controller may be operated in such a way, but must not always be operated in such a way. In other words, the specific operation of pacing out data units over a release period must not always be conducted for every plurality of data units to be released, but can be used selectively, e.g. only in a specific mode of operation, or depending on the number of data units to be released. This again emphasizes the flexibility provided by the concept of the present invention.

According to a preferred embodiment of the present invention, the data unit handling device is arranged such that a maximum release period is determined on the basis of an accumulation time, the accumulation time being an amount of time that passes between two consecutive releases of a plurality of data units from the buffer, and the release of data units in the event of a pacing operation being such that the release period over which the plurality of data units is released is equal to or smaller than said maximum release period.

According to another preferred embodiment, in a system where the first protocol layer that passes data units upwards is operable to conduct a transmission feedback procedure according to which a receiving peer of the first protocol layer issues a feedback message to a sending peer of the first protocol layer to thereby provide information on the receipt of one or more data units, the data unit handling device is arranged such that the maximum release period is determined on the basis of a feedback interval of the transmission feedback procedure. The feedback interval is generally a value indicative of the time that passes between the sending of two consecutive feedback messages by the receiving peer. The maximum release period can be determined in any appropriate way with respect to the feedback interval, e.g. it can be chosen as equal to the feedback interval. The feedback interval can be defined in any suitable way, e.g. as a function of the round trip time RTT (e.g. the maximum release period can be set equal to the RTT), or the feedback interval can be chosen in any other suitable way depending on the specific implementation and requirements. For example, in a system using a feedback prohibit procedure according to which after sending a feedback message, no further feedback messages are sent until a feedback prohibit time has elapsed, the feedback interval can be defined as being equal to said feedback prohibit time. An example of such a feedback prohibit time is the value of the so-called status prohibit timer known from UMTS (universal mobile telecommunication system).

The significance of associating the maximum release period with a feedback interval is that typically the feedback procedure will be related to a retransmission procedure for data units that were not received or not correctly received, and that such retransmissions by the sender will at the receiver typically lead to the situation that a plurality of data units stands to be released, especially (although not exclusively) if the data units are to be released upwards in sequence (in-order delivery). Namely, with in-sequence delivery, the above described situation arises according to which the receipt of a missing packet (the receipt being due to a retransmission) in a sequence leads to a series of data units suddenly being complete, such that the whole series could be released.

In such embodiments of the present invention that employ a maximum release period, it is preferable that the data release rate for releasing a plurality of data units over a release period is a function of the maximum release period and the number of data units to be released. More preferably, the release period is equal to or larger than the value obtained by dividing the number of said plurality of data units to be released by the maximum release period. Regarding the data release rate, it is also preferable if this data release rate is equal to or greater than the buffer fill rate, i.e. the rate with which the buffer fills with data units that are to be released upwards. In this way a buffer overflow can be avoided.

As already mentioned previously, it is not necessary that every plurality of data units is paced out over a given period. Much rather, the present invention is also applicable in such a way that a predetermined threshold of the number of data units to be released is set, such that only if the number of data units to be released is larger than said threshold, is said plurality paced out, and otherwise the data units are released instantly.

Also, it is possible that the data units are paced out one at a time, or that at least some of said data units are paced out n-tuples, where n is an integer.

Regarding the example layer structure shown in FIG. 8, the present invention is preferably applied in connection with the link layer L2 as the first protocol layer, and the network layer L3 as the second protocol layer. More preferably, the invention is applied such that the link layer protocol is a protocol for controlling the transmission of data units over a wireless link, for example a wireless link conforming to the UMTS standard.

With respect to the present invention it may be noted that the concept of pacing out packets is known in connection with a sender of data units, i.e. the downward passing of data units in a protocol hierarchical, e.g. in a leaky bucket scheme, but that the present invention proposes employing pacing on the receiving side in the upwards direction of the protocol stack.

BRIEF DESCRIPTION OF FIGURES

The invention will now be described in conjunction with various embodiments that shall be described in the following with reference to the appended figures, in which:

FIG. 2a shows an example of releasing pluralities of data units instantly;

FIG. 2b shows the same situation as FIG. 2a, but pacing out data units over respective release periods $T_i$;

FIG. 3 shows an example of releasing data units in n-tuples;

DETAILED DESCRIPTION OF THE PRESENT INVENTION

Figure 1:
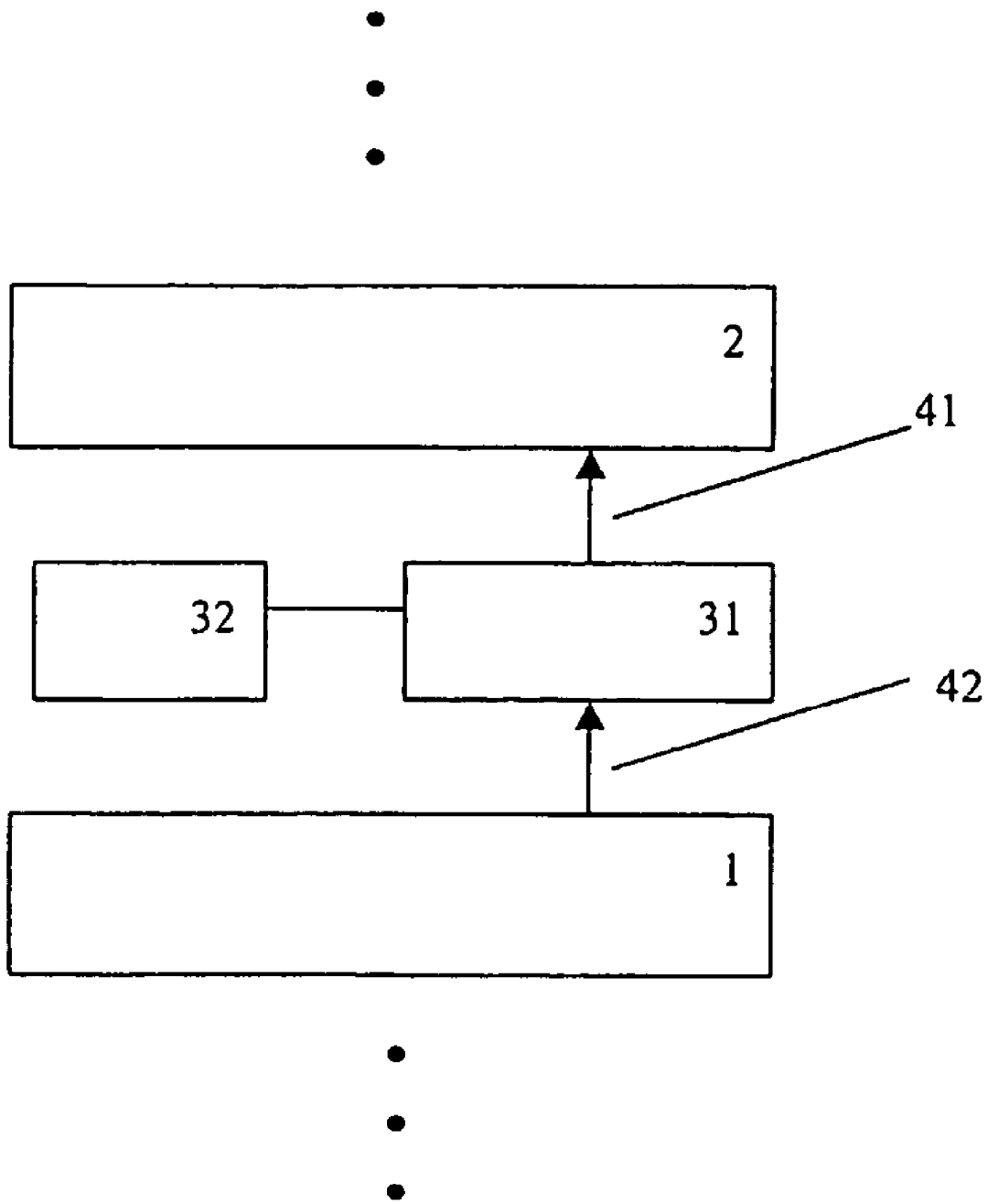
FIG. 1 describes a schematic representation of a basic embodiment of the present invention.

FIG. 1 shows a schematic representation of a basic embodiment of the present invention, where reference numeral 1 refers to a first protocol layer, reference numeral 2 refers to a second layer that lies above the first protocol layer 1, 31 represents a buffer that is operable to accumulate a plurality of data units that conform to the second protocol layer 2 before being released upwards to the second protocol layer 2 and 32 refers to a buffer controller for controlling the buffer 31. Arrow 42 indicates a passing of data from the first protocol layer 1 to buffer 31, and arrow 41 indicates a release of data from buffer 31 to a second protocol layer 2.

The dots at the top and bottom of FIG. 1 indicate that other protocol layers may lie above the second layer 2 and that further protocol layers may lie below the first protocol layer 1. Also, it may be noticed that the first and second protocol layers do not need to be contiguous, although they preferably are. In the case of the first and second protocol layers being contiguous, the buffer 31 is preferably a part of the implementation of the first protocol layer 1.

In accordance with the present invention, the buffer controller 32 is operable to control the release 41 of data units conforming to the second protocol layer 2 from the buffer 31 in such a way that when a plurality of data units conforming to the second protocol layer 2 is to be released, the individual data units of said plurality are released over a release period T that is longer than the period of time that would occur if all of the data units of the plurality were released instantly. In other words, the data units are paced out over the release period T.

By releasing the data units to the second protocol layer 2 over a release period T longer than the time span for instant release, any problems due to bursty release of data units at the second protocol layer 2 or at a protocol layer above layer 2 can be avoided. The present invention is not specifically concerned with the reasons why a plurality of data units are buffered in buffer 31 before being released. In other words, the present invention is applicable to any system where data units are buffered in a receiving system before being passed upwards in a protocol stack. However, it may be noted that such buffering e.g. occurs in systems that use in-order delivery, such that one preferred application of the present invention is in such system that use in-order delivery.

Figure 8:
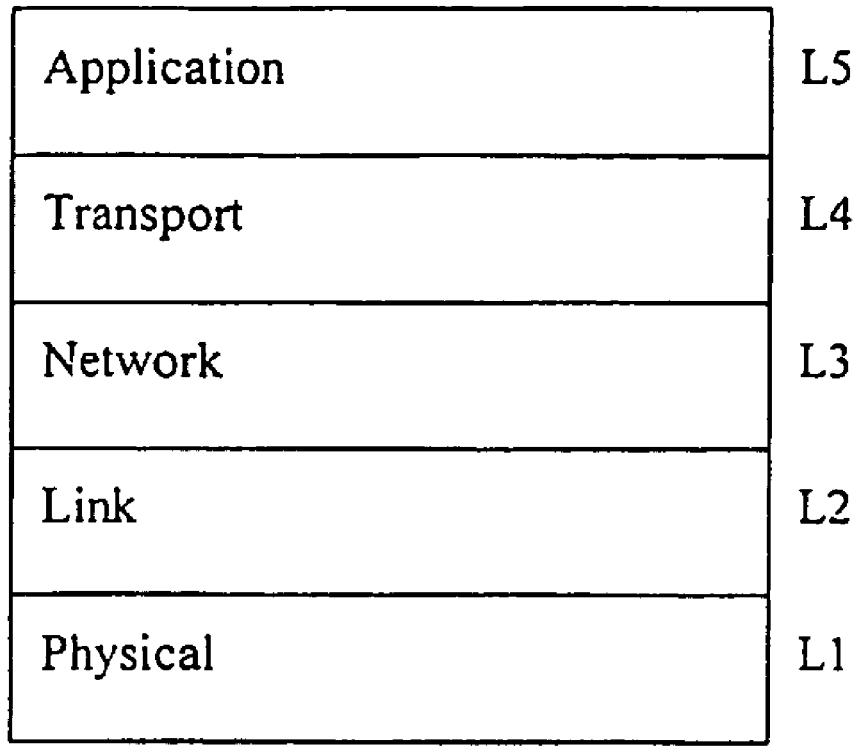
FIG. 8 is a schematic representation of a protocol stack.

In the context of the example given in FIG. 8, the first protocol layer 1 can be any of the protocol layers L1 to L4, while the second protocol layer can be any of the protocol layers L2 to L5. Preferably, the first protocol layer is a link layer L2, and the second protocol layer is a network layer L3. The present invention is especially well applicable in the case where the link layer 1 is associated with a link having a high transmission capacity, for example if the link is established in accordance with the UMTS (universal mobile telecommunications system) standard. Naturally, this is only an example and the present invention can be applied to any type of link, e.g. a link established in association with GPRS (general packet radio service). Namely, in such systems having a high link capacity, a large number of data units may accumulate in the buffer, such that an instant release would lead to a large burst, where the present invention avoids such a burst by providing the possibility of pacing out the data units over a longer period of time than the time necessary for instant release.

The buffer controller 32 is operable to control the buffer 31 in the above described way. This means that the buffer 31 and buffer controller 32 are capable of performing such an operation, but such an operation must not always be performed. Much rather, such a pacing operation can also be conducted selectively, depending on external or internal conditions. An example of an external condition is the external setting of a specific operation mode, and an internal condition can e.g. depend on the number of packets to be released.

The pacing out of data units from buffer 31 to the second protocol layer 2 can be performed in any suitable or desirable way, as long as a release period T is achieved that is longer than the period of time that would occur if all of the data units of the given plurality were released instantly. This can e.g. be achieved by releasing one data unit at a time and setting a predetermined delay time between each release of one data unit, where this predetermined delay time can e.g. be constant. In such a simple system with a constant delay, the release period will only depend on the number of data units being released.

However, it is preferable to control the pacing out of a plurality of data units in accordance with a maximum release period $T_M$, where $T_M$ is an adaptive parameter. This means that first a maximum release period $T_M$ is set, and then the pacing out of the data units is performed in such a way that the actual release period T is equal to or smaller than $T_M$. The use of such a maximum release period $T_M$ enhances the controllability and flexibility of the system, because the actual release period T can be influenced and varied in dependence on internal or external conditions and parameters.

Figure 5:
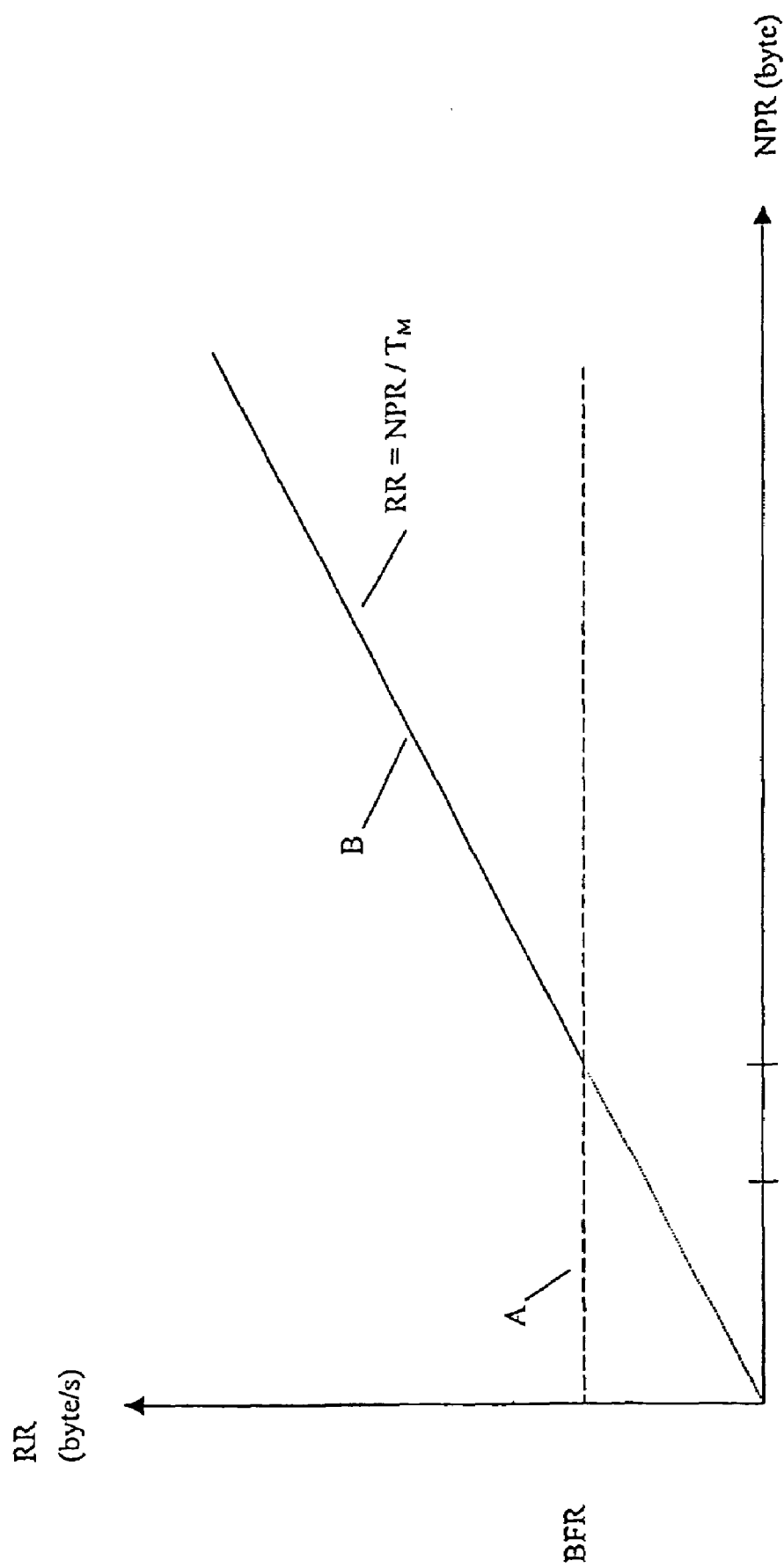
FIG. 5 illustrates an example for determining the release rate RR on the basis of the number NPR of data units to be released and a maximum release period $T_M$.

Preferably, when controlling the release of a plurality of data units with the help of a maximum release period $T_M$, the release rate RR is determined in dependence on the number of data units to be released (NPR), i.e. the number of data units that form the plurality to be released, and of the maximum release period $T_M$. FIG. 5 shows one example, where reference sign B indicates the function RR=NPR/$T_M$, where the actual release rate RR can be chosen such that RR$\geq$NPR/$T_M$.

In other words, the release rate RR is determined on the basis of a linear function of the number of data units to be released (NPR), where the linear function is proportional to 1/$T_M$. Preferably, the release rate RR is adjusted to be equal to this function NPR/$T_M$, or larger than this function. If the plurality of data units is released with a release rate equal to NPR/$T_M$, then the actual release period T is equal to the maximum release period $T_M$, whereas if the release rate is chosen larger than NPR/$T_M$, then the actual release period becomes smaller than the maximum release period $T_M$.

According to another embodiment of the invention, the release rate RR is also adjusted in dependence on the buffer fill rate BFR. The buffer fill rate is the rate at which the buffer 31 is filled with data from first protocol layer 1 (see arrow 42 in FIG. 1). For example, if the first protocol layer 1 is a link layer, then the buffer fill rate will depend on the link transmission rate of the link associated with the link layer. It is preferable that the release rate be at least equal to the buffer fill rate BFR, or larger. In other words, as indicated in FIG. 5, in this embodiment the release rate RR is chosen to lie above both the curves A and B. Therefore, the release rate RR is equal to or larger than A for a number NPR of data units to be released between 0 and the intersection value IS, and equal to or larger than $NPR/T_M$ for values of the number NPR of data units to be released larger than IS.

Figure 6:
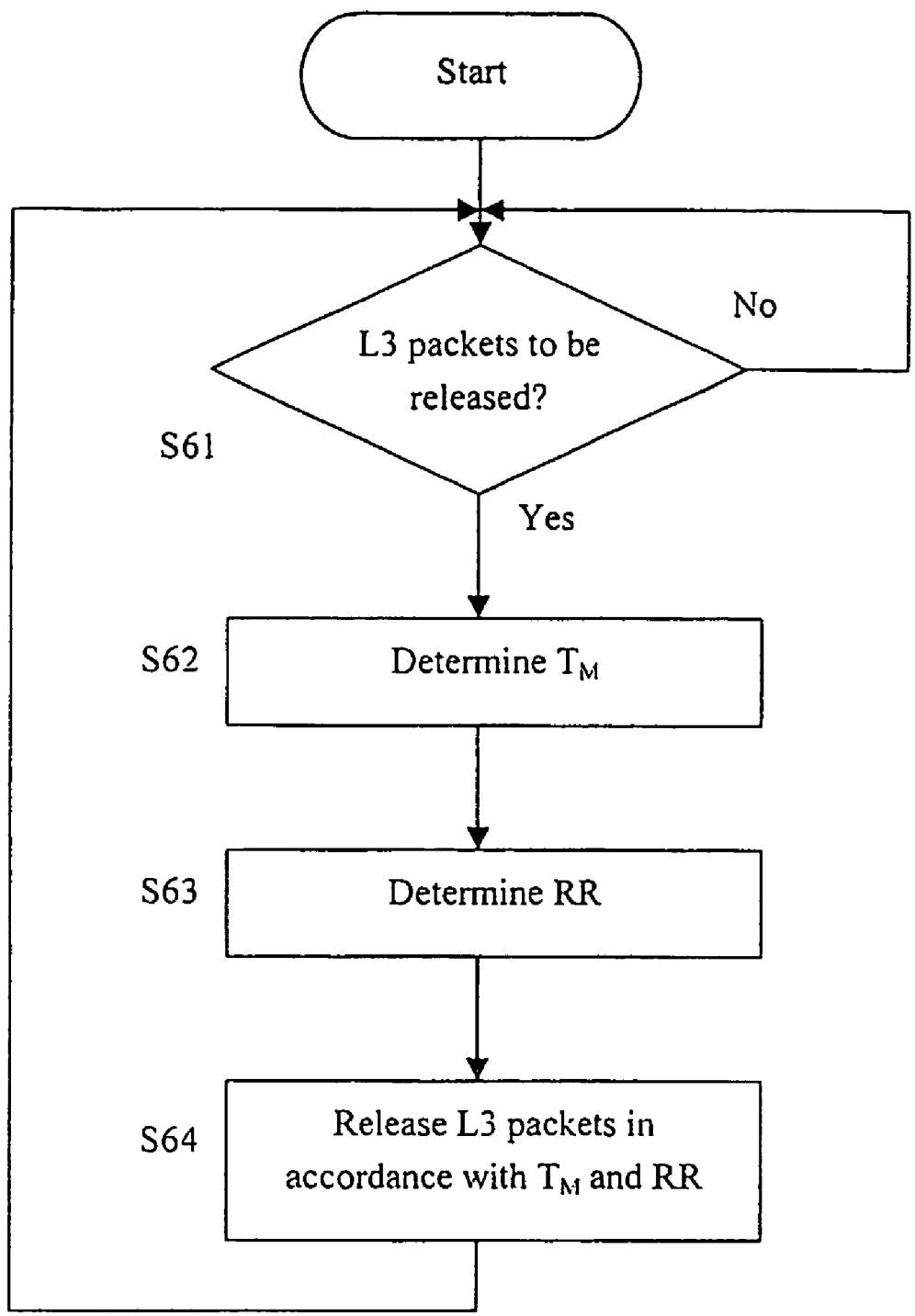
FIG. 6 is a flow chart describing an example of a basic control procedure for releasing a plurality of data units from a buffer in accordance with the present invention.

A flow chart describing the an example of a control procedure for releasing a plurality of data unit in the above described way is shown in FIG. 6. The example of FIG. 6 assumes that the second layer is the network layer L3, such that the data units being released are L3 packets. In a first step S61 it is determined if there are any L3 packets to be released. This determination will depend on the specific details of the system to which the invention is applied. For example, if the network layer L3 requires in-order delivery and the link layer L2 to which the buffer 31 belongs performs an error recovery procedure (such as ARQ), then the determination of step S61 will be a procedure for determining if a missing packet has successfully been recovered, such that the missing packet and all following packets in the predetermined order for delivery that have already been successfully received, may be released to the network layer L3.

Returning to FIG. 6, a maximum release period $T_M$ is determined in step S62, then a release rate RR is determined in step S63, and finally the L3 packet are released in accordance with $T_M$ and RR, e.g. in such a way that T is equal to $T_M$, or smaller.

In the above described examples, it was assumed that any plurality of data units is paced out, regardless of how few data units there are. However, it is also possible to introduce a threshold Th, such that only if the number of data units to be released exceeds said threshold, is a pacing actually performed. In other words, it is possible to arrange the buffer controller 32 in such a way that the release of data units over a release period longer than the instant release time is only conducted if the number of data units in the plurality to be released exceeds the threshold Th, and if the number is smaller than Th, the plurality is released instantly. The use of such a threshold Th can be combined with any of the above embodiments, and the example of FIG. 5 shows a threshold Th lying below the intersection point IS of the buffer fill rate BFR and the function $NPR/T_M$. However, it may be noted that Th is completely independent of IS and may therefore also be equal to IS or larger.

Figure 7:
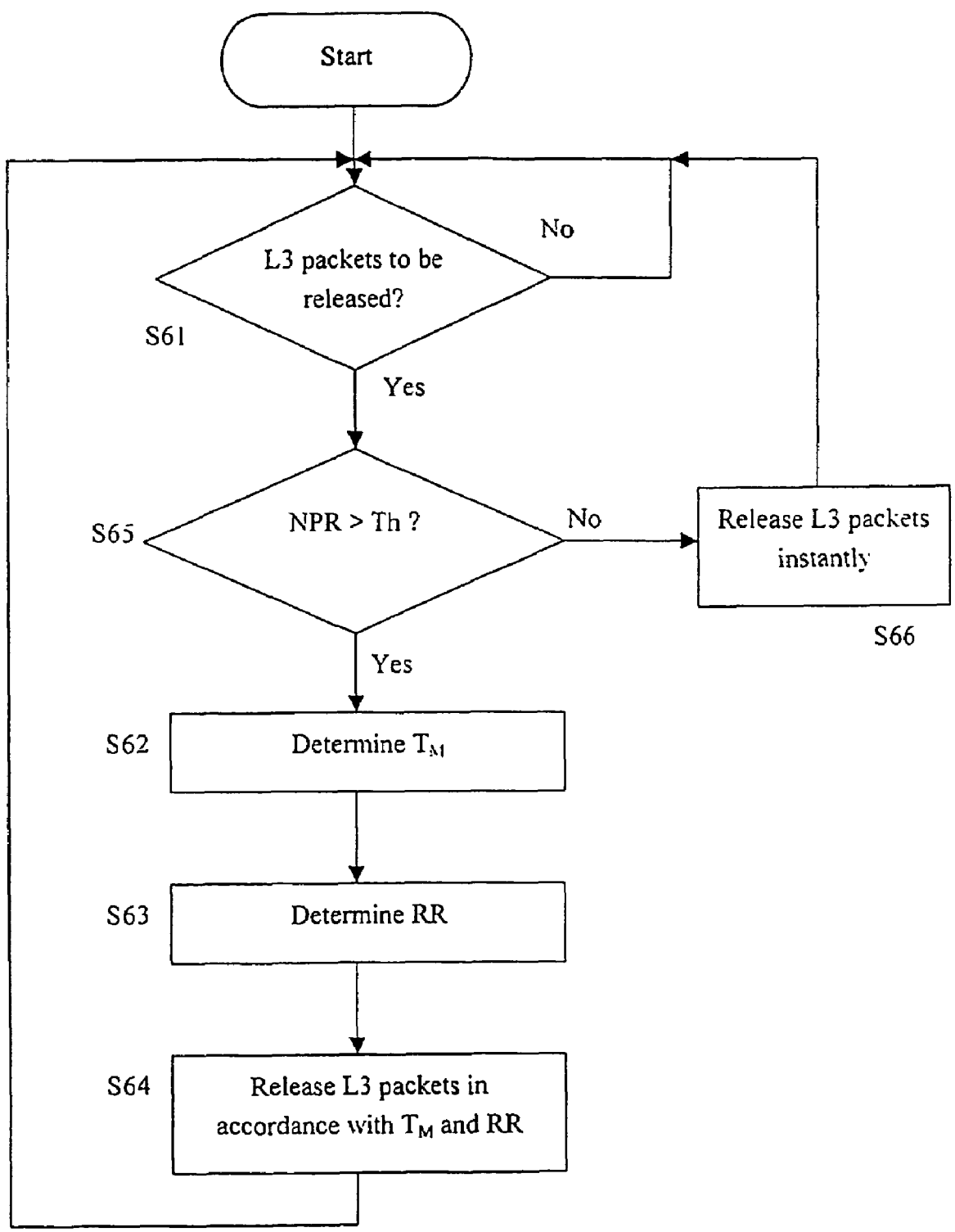
FIG. 7 is another schematic flow chart describing another example of a basic control procedure for releasing a plurality of data units from a buffer in accordance with the present invention.

FIG. 7 shows a schematic flow chart of a corresponding control procedure, where the same reference numerals as in FIG. 6 are used to describe the same or equivalent steps, such that a description of these steps is not repeated. In addition to the steps shown in FIG. 6 the procedure of FIG. 7 comprises a step S65 that follows step S61, where step S65 determines if the number NPR of data units to be released exceeds the threshold Th. If this is not the case, the L3 packets are released instantly, as indicated in step S66. If the threshold Th is exceeded, then steps S62 to S64 are performed.

In the examples described above in connection with FIGS. 6 and 7, packet release control was performed in such a way that once the release of a group of packets is begun (step S64), all of the packets of the plurality are released according to $T_M$ and RR. Any packets that become ready to be released during this release procedure, e.g. due to lower layer packets that arrive during the actual release period T determined by $T_M$ and RR, are buffered and may only be released in the next group following the next determination in step S61 after the completion of step S64.

However, the invention is not restricted thereto, and it is equally well possible to adapt the release mechanism immediately to such new packets to be released. This shall be explained with reference to the examples shown in FIGS. 9 and 10.

Figure 9:
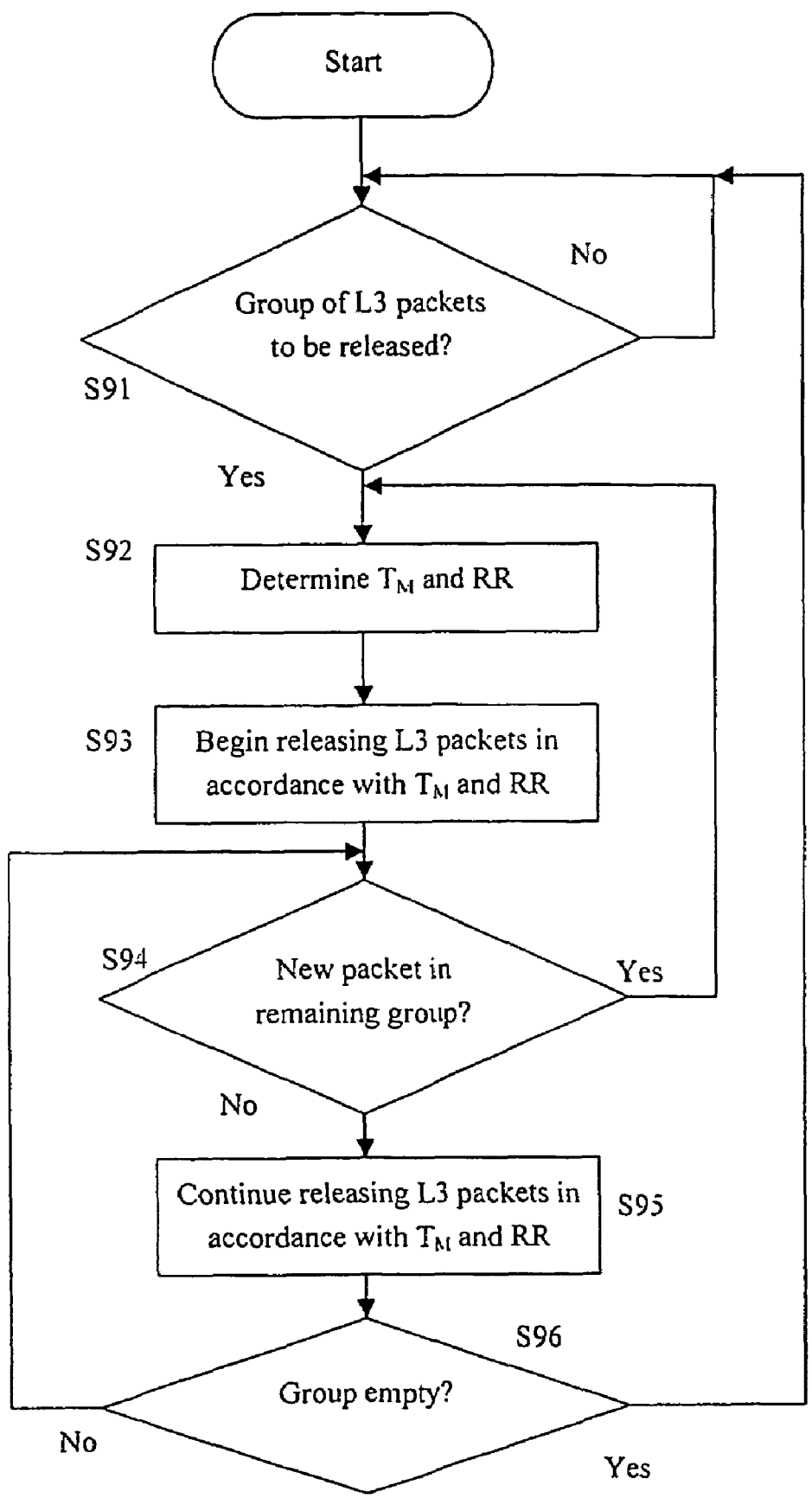
FIG. 9 is another schematic flow chart describing another example of a basic control procedure for releasing a plurality of data units from a buffer in accordance with the present invention.

FIG. 9 shows a flow chart that relates to an example similar to that of FIG. 6. In a first step S91 it is determined if there is a group of packets to be released. The term "group" may refer to any number of packets, including one. If there is a group of packets ready for release, then $T_M$ and RR are determined in step S92 and the release of packets is begun in step S93. This means that the first packet or packets of the group are paced out, while usually one or more packets of the current group will remain in the buffer. For example, if the group consists of three packets and the pacing is done such that the packets are released one at a time, then in a first instance only one packet is released and two remain in the buffer. In step S94 it is determined if new packets are among the remaining packets, i.e. if in the mean time new packets are ready for release that were not yet among the group determined in previous step S91 for which the current values of $T_M$ and RR were determined. For example, such new packets could be due to new L2 data units arriving that are the assembled into new L3 packets. If there are new packets to be released that were not taken into account in the current values of $T_M$ and RR, the procedure loops back to step S92, in order to determine new values of $T_M$ and RR, and to then release this new group in accordance with the new values (step S93). If no new L3 packets are ready for release, i.e. the outcome of step S94 is "no", then the release of packets continues with the current values of $T_M$ and RR, see step S95. In the above example of originally three packets in the group, this means that the second packet is released. In step S96 it is determined if the group of packets being released is empty, i.e. has been reduced to zero, which means that all of the packets in the group would have been released. If the group is empty the procedure loops back to step S91. If there are packets remaining in the group, the procedure loops back to step S94.

Figure 10A:
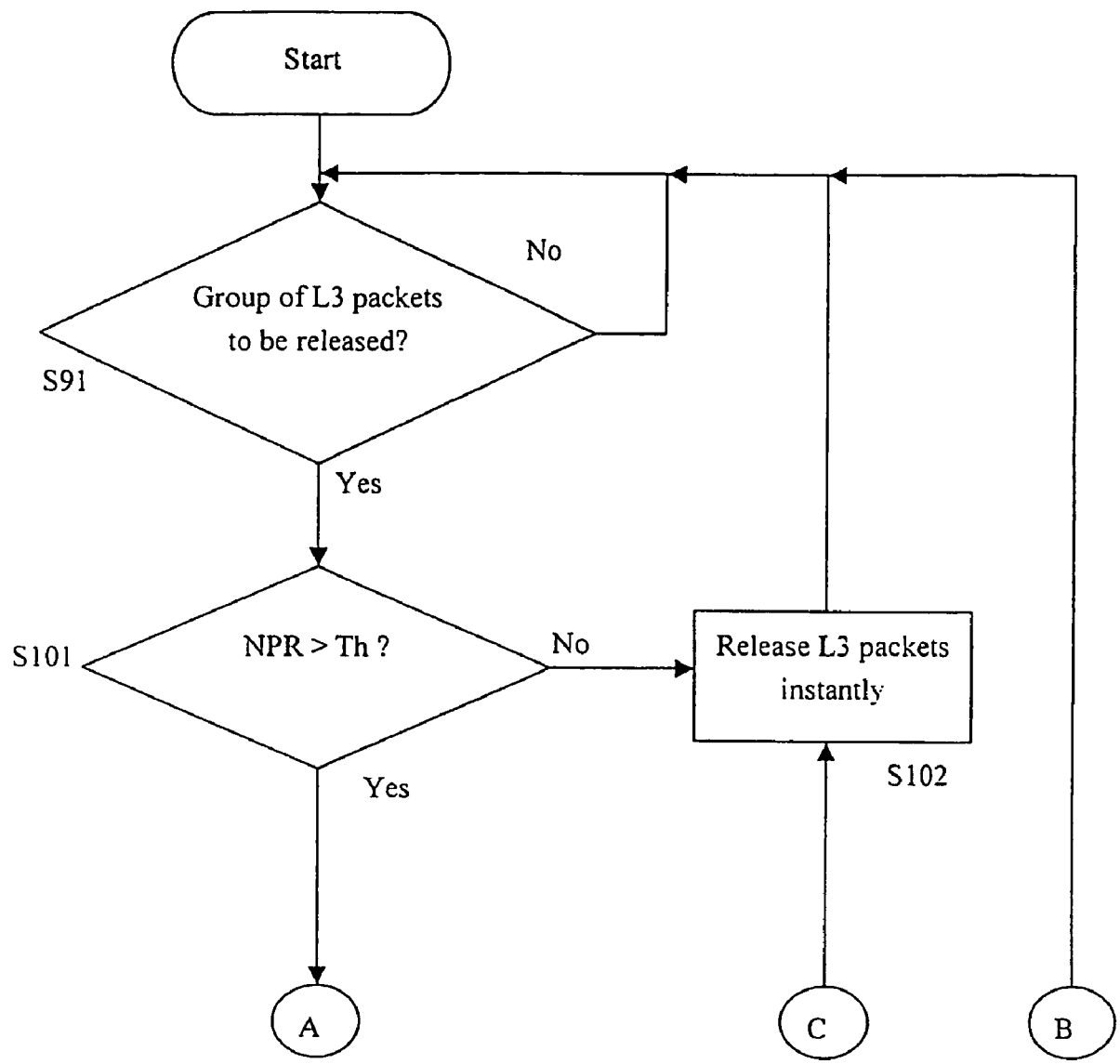
FIG. 10 is yet another schematic flow chart describing another example of a basic control procedure for releasing a plurality of data units from a buffer in accordance with the present invention.
Figure 10B:
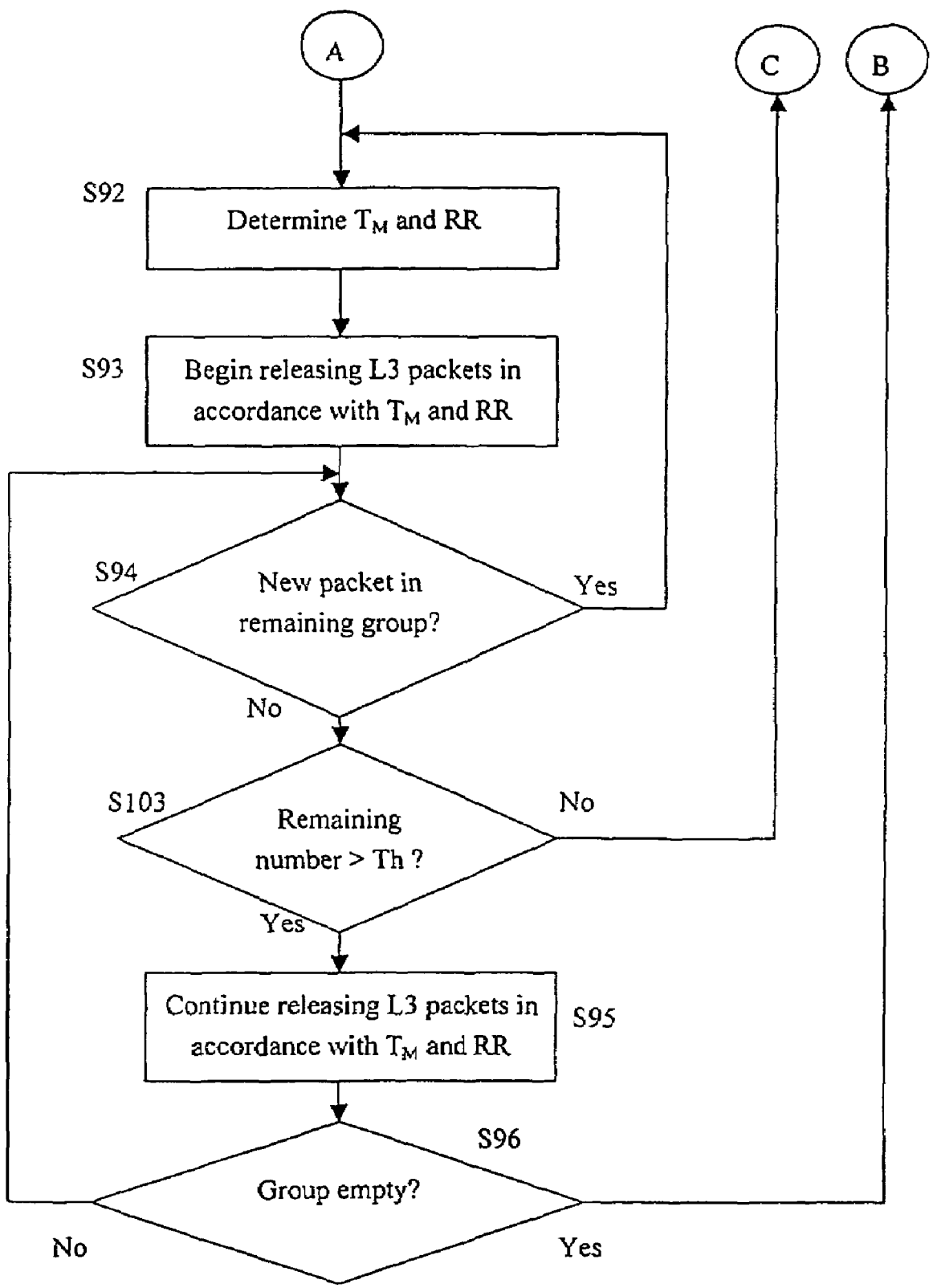

FIGS. 10a and 10B show a variation of the method explained in connection with FIG. 9, where the method of FIGS. 10a and 10b is similar to that of FIG. 7. Namely, the method of FIG. 10 provides the additional feature that if the number of packets in a group is smaller than a predetermined threshold, these packets are released instantly. The same reference numerals as in FIG. 9 refer to the same or similar elements in FIG. 10a and 10b, such that a repeated description is not necessary.

The method of FIG. 10 is such that after step S91 it is determined if the number of packets to be released (i.e. the number of packets in the group) is larger than the threshold. If not, the packets are released instantly (i.e. all at once), and the procedure loops back to step S91. If the number is larger than the threshold, steps S92, S93 and S94 are conducted, as previously described in connection with FIG. 9. If the outcome of step S94 is "no", then the flow proceeds to step S103, in which it is determined if the remaining number of packets to be released is larger than the threshold Th. If not, the procedure goes to step S102 and releases the remaining packets instantly. If the number is larger than Th, the procedure continues with steps S95 and S96, as already described in connection with FIG. 9.

While the examples of FIGS. 6, 7, 9 and 10 show steps in a specific order, the skilled person understands that these steps may also be arranged differently. Also, alternative steps may be employed. For example, instead of determining if a number of packets to be released is larger than a threshold, it is also possible to determine if the number is smaller than the threshold and to arrange the sequence of steps accordingly.

Regarding the determination of the release rate RR as discussed in connection with FIG. 5, it is mentioned that both the number of data units to be released NPR and the buffer fill rate BFR are dynamic parameters that vary over time. Consequently, the release rate will also be variable over time.

The maximum release period $T_M$ can be determined in any appropriate or suitable way. For example, the maximum release period $T_M$ can be chosen as a constant value. However, it is preferable to choose the maximum release period $T_M$ as an adaptive, dynamic parameter.

Preferably, the maximum release period $T_M$ is determined on the basis of the accumulation time AT associated with the operation of buffer 31. Namely, the accumulation time AT is the period of time that passes between two consecutive releases of a plurality of data units from the buffer 31. More specifically, the accumulation time is the period of time that passes between two consecutive events that allow the release of a plurality of buffered data units. The relationship between the maximum release period $T_M$ and the accumulation time AT can be chosen in any desired or suitable way, e.g. the maximum release period $T_M$ can be set equal to the accumulation time AT or to some parameter derived from the accumulation time AT, such as the minimum accumulation time $AT_{min}$ or the average accumulation time $AT_{av}$.

For example, if the maximum release period $T_M$ is set equal to the accumulation time, then the accumulation time is simply monitored during the buffer control operation, and each time that a new value of the accumulation time AT is determined, the maximum release period $T_M$ is updated to said new value of AT. The minimum accumulation time $AT_{min}$ can simply be monitored as a running value, namely by storing the present minimum value and comparing every new value of AT with the stored minimum value $AT_{min}$, and if the new value of AT is smaller than the stored value $AT_{min}$, the new value is stored as a new minimum value $AT_{min}$, and the value of $T_M$ is accordingly updated. Finally, when using the average accumulation time, it is preferable to determine this average accumulation time $AT_{av}$ as a running average, i.e. with every new determination of an accumulation time value, the running average is updated, and accordingly the maximum release period $T_M$ is also updated.

Naturally, these are only examples, and the maximum release period $T_M$ can be determined on the basis of any other parameter derivable from the accumulation time AT, or on combinations of such parameters.

In the specific case that the first protocol layer is implemented to assemble data units of the first protocol layer 1 into data units of the second protocol layer 2, when acting as a receiving peer, and the first protocol layer 1 conducts a transmission feedback procedure, it is also possible to adjust the maximum release period $T_M$ on the basis of the feedback interval FI of the transmission feedback procedure. Namely, the transmission feedback procedure is arranged in such a way that a receiving peer of the first protocol layer issues a feedback message to a sending peer of the first protocol layer for providing information on the receipt of one or more data units of the first protocol layer (e.g. an ARQ mechanism), and the feedback interval FI is a value indicative of the time that passes between the sending of two consecutive feedback messages by the receiving peer.

Any value providing an indication of the time that passes between the sending of two consecutive feedback messages by the receiving peer is suitable. As an example, the period of time that passes between the sending of two consecutive feedback messages in a feedback procedure may generally depend on the round trip time (RTT) associated with the connection over which data units are being sent from the sending peer to the receiving peer. Consequently, the maximum release period $T_M$ can be determined on the basis of the round trip time RTT, i.e. generally as an arbitrary function of RTT, e.g. as being equal to RTT.

In the specific case where the feedback procedure additionally comprises a feedback prohibit procedure according to which after sending a feedback message, no further feedback messages are sent until a feedback prohibit time has elapsed, the feedback interval can also be defined by such a feedback prohibit time. Then the maximum release time $T_M$ can be chosen as any arbitrary function of the feedback prohibit time, e.g. equal to the feedback prohibit time. An example of a feedback prohibit time is the value of the UMTS status prohibit timer as defined in 3GPP technical specification group radio access network, RLC protocol specification, 3G TS25.322.

Now a number of simple examples of applying the present invention shall be described in connection with FIGS. 2 to 4. FIG. 2a is a graph showing a situation where pluralities of data units are released in bursts, e.g. FIG. 2a shows the prior art situation. The individual data units are identified by the sequence number (arbitrary units), and the abscissa shows the time t. As can be seen in FIG. 2a, a plurality of three data units is released at time $t_1$, four data units are released at a time $t_2$, two data units are released at a point $t_3$, six data units are released $t_4$ and two data units are released at a point in time $t_5$.

The respective time differences ($t_2$-$t_1$), ($t_3$-$t_2$), ($t_4$-$t_3$) are accumulation times AT.

FIG. 2b shows one example of applying the present invention to the situation shown in FIG. 2a. As can be seen, the respective pluralities shown in FIG. 2a are paced out over respective release periods $T_i$. More specifically, the three data units released instantly at t1 in FIG. 2a are paced out over the release period $T_1$ in FIG. 2b, the four data units released instantly at $t_2$ in FIG. 2a are paced out over release period $T_2$ in FIG. 2b, etc.

In FIG. 2b it was assumed that the data units of a plurality are released one at a time. However, it is also possible to release some or all of the data units in n-tuples. An example of this is shown in FIG. 3. In FIG. 3 a plurality of 15 data units is released over a release period Ti in triples. Naturally, this is only an example, and the n-tuples can basically be chosen in conjunction with any integer value of n. Also, it may be noted that n must not be constant such that the data units can be released as a variety of n-tuples. For example, it is possible that a certain amount of data units is released one at a time, and another part of the plurality of data units to be released is released in pairs, another group in triples, etc.

Figure 4A:
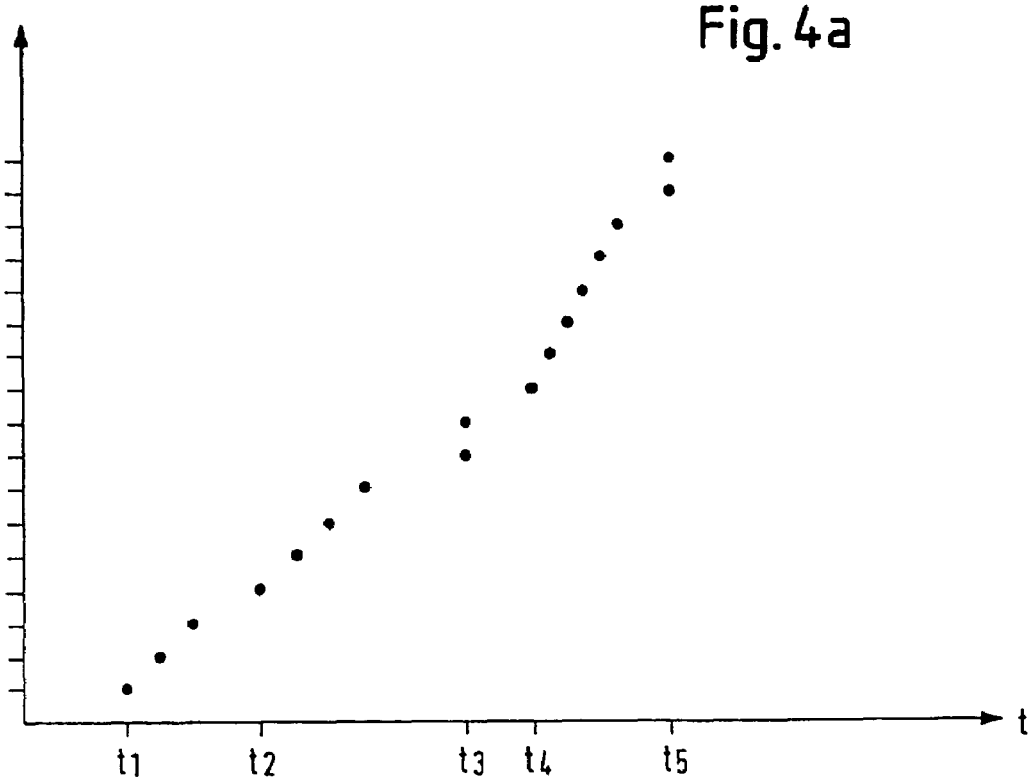
FIG. 4a shows the same situation as FIG. 2b, except that a threshold Th is introduced, such that if the number of data units to be released is smaller than said threshold Th, the plurality is released instantly.
Figure 4B:
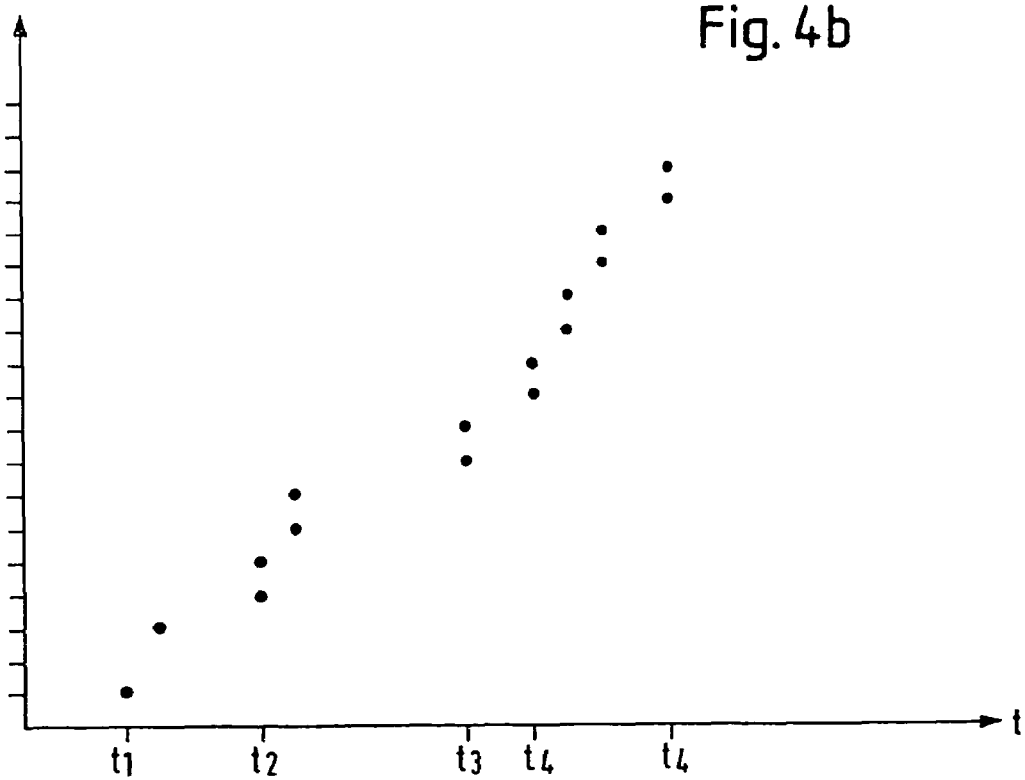
FIG. 4b shows a similar example as FIG. 4a, where the concepts of thresholding and releasing n-tuples have been combined.

FIG. 4 shows examples employing the concept of thresholding as explained in connection with FIGS. 5 and 7. Namely, FIG. 4a shows the same situation as FIG. 2b, except that a threshold Th has been set to two, such that pairs of packets (see time t3 and t5) are released instantly. FIG. 4b shows a similar case as FIG. 4a, where the concepts of thresholding and releasing n-tuples have been combined. In the example, pairs of packets are released instantly (Th=2), and if the number of packets to be released is larger than 2, then they are paced in pairs.

Although the present invention has been described in connection with detailed embodiments, the invention is not to be understood as being restricted to the above-mentioned examples. Namely, although it is preferable to apply the invention in such a way that the first protocol layer is a link layer, and said link layer is associated with a mobile link established in conformity with the universal mobile telecommunication system (UMTS) standard, the present invention is by no means restricted thereto. Much rather, the first protocol layer can be any arbitrary protocol layer that is arranged to pass data units upwards to a buffer, where said buffer is arranged to buffer data units conforming to a second protocol layer laying above the first protocol layer. Therefore, the present invention is not restricted by the detailed examples, which have only be given to convey a better understanding of the present invention, but much rather the present invention is defined by the appended claims. Furthermore, reference signs in the claims are not to be understood as restricting these claims, as they are only intended to make the claims easier to read.

The invention claimed is:

1. A data unit handling device, including an implementation of a first protocol layer and an implementation of a second protocol layer, said second protocol layer lying above said first protocol layer, and said first protocol layer being arranged to pass data units upwards towards said second layer when acting as a receiving peer in a communication, comprising:
 a buffer for buffering data units to be released to said second layer by said first layer, said buffer being operable to accumulate a plurality of data units conforming to said second protocol layer before releasing said data units conforming to said second protocol layer, and
 a buffer controller being operable to control the release of said data units conforming to said second protocol layer from said buffer in such a way that when a plurality of data units conforming to said second protocol layer is to be released, the individual data units of said plurality are released over a release period (T), said release period (T) being longer than the period of time that would occur if all of the data units of the plurality were released instantly.

2. The data unit handling device according to claim 1, wherein said buffer is a part of said first protocol layer.

3. The data unit handling device according to claim 1, wherein said data units conforming to said second protocol have a predetermined order, and said buffer controller is arranged to release said data units of said second protocol in said order.

4. The data unit handling device according to claim 1, wherein said data unit handling device is arranged such that a maximum release period ($T_M$) is determined on the basis of an accumulation time (AT), said accumulation time (AT) being the amount of time that passes between two consecutive releases of a plurality of data units from said buffer.

5. The data unit handling device according to claim 1, wherein
 said first protocol layer is implemented to assemble data units conforming to said first protocol layer into data units conforming to said second protocol layer when acting as a receiving peer,
 the implementation of said first protocol layer is operable to conduct a transmission feedback procedure according to which a receiving peer of said first protocol layer issues a feedback message to a sending peer of said first protocol layer for providing information on the receipt of one or more data units conforming to said first protocol layer, and
 the data unit handling device is arranged such that a maximum release period ($T_M$) is determined on the basis of a feedback interval (FI) of said transmission feedback procedure, said feedback interval (FI) being a value indicative of the time that passes between the sending of two consecutive feedback messages by said receiving peer.

6. The data unit handling device according to claim 5, wherein said transmission feedback procedure comprises a feedback prohibit procedure according to which after sending a feedback message, no further feedback messages are sent until a feedback prohibit time has elapsed, where said feedback interval is equal to said feedback prohibit time.

7. The data unit handling device according to claim 6, wherein said maximum release period ($T_M$) is equal to said feedback prohibit time.

8. The data unit handling device according to claim 6, wherein said first protocol layer is a link layer (L2) comprising a link layer protocol,
 said data unit handling device is arranged to receive data units conforming to said link layer protocol over a communication link,
 said communication link conforms to the standard of the universal mobile telecommunications system,
 said feedback messages are universal mobile telecommunications system status messages, and
 said feedback prohibit time is the value set for the universal mobile telecommunications system status prohibit timer.

9. The data unit handling device according to claim 4, wherein a data release rate (RR) for releasing said plurality of data units over said release period (T) is a function of the number (NPR) of said plurality of data units to be released and the maximum release period ($T_M$).

10. The data unit handling device according to claim 9, wherein said data release rate (RR) for releasing said plurality of data units over said release period (T) is equal to or larger than the value obtained by dividing the number (NPR) of said plurality of data units to be released by said maximum release period ($T_M$).

11. The data unit handling device according to claim 9, wherein the data release rate (RR) for releasing said plurality of data units over said release period (T) is equal to or greater than a buffer fill rate (BFR).

12. The data unit handling device according to claim 1, wherein said buffer controller is operable to control the release of said data units conforming to said second protocol layer from said buffer in such a way that the individual data units of said plurality are released over said release period (T) longer than the period of time that would occur if all of the data units of the plurality were released instantly only if the number (NPR) of said plurality of data units to be released exceeds a predetermined threshold (Th), and are released instantly otherwise.

13. The data unit handling device according to claim 1, wherein said data unit handling device is arranged such that at least a part of said data units of said plurality of data units to be released over said release period (T) are released n at a time, n being an integer larger than one (1).

14. The data unit handling device according to claim 1, wherein said first protocol layer is a link layer (L2) comprising a link layer protocol, and said data unit handling device is arranged to receive data units conforming to said link layer protocol over a communication link.

15. The data unit handling device according to claim 14, wherein said communication link is a wireless link and said link layer protocol is a protocol for controlling the transmission of data units over said wireless link.

16. A method of controlling a data unit handling device, including an implementation of a first protocol layer and an implementation of a second protocol layer, said second protocol layer lying above said first protocol layer, and said first protocol layer being arranged to pass data units upwards towards said second layer when acting as a receiving peer in a communication, and a buffer for buffering data units to be released to said second layer, said buffer being operable to accumulate a plurality of data units conforming to said second protocol layer before releasing said data units conforming to said second protocol layer, said method comprising:

controlling the release of said data units conforming to said second protocol layer from said buffer in such a way that when a plurality of data units conforming to said second protocol layer is to be released, the individual data units of said plurality are released over a release period (T), said release period (T) being longer than the period of time that would occur if all of the data units of the plurality were released instantly.

17. The method according to claim 16, wherein said data units conforming to said second protocol have a predetermined order, and said buffer controller is arranged to release said data units of said second protocol in said order.

18. The method according to claim 16, wherein a maximum release period ($T_M$) is determined (S62) on the basis of an accumulation time (AT), said accumulation time (AT) being the amount of time that passes between two consecutive releases of a plurality of data units from said buffer.

19. The method according to claim 16, wherein
said first protocol layer is implemented to assemble data units conforming to said first protocol layer into data units conforming to said second protocol layer when acting as a receiving peer,
the implementation of said first protocol layer conducts a transmission feedback procedure according to which a receiving peer of said first protocol layer issues a feedback message to a sending peer of said first protocol layer for providing information on the receipt of one or more data units conforming to said first protocol layer, and
a maximum release period ($T_M$) is determined on the basis of a feedback interval (FI) of said transmission feedback procedure, said feedback interval (FI) being a value indicative of the time that passes between the sending of two consecutive feedback messages by said receiving peer.

20. The method according to claim 19, wherein said transmission feedback procedure comprises a feedback prohibit procedure according to which after sending a feedback message, no further feedback messages are sent until a feedback prohibit time has elapsed, where said feedback interval is equal to said feedback prohibit time.

21. The method according to claim 20, wherein said maximum release period ($T_M$) is equal to said feedback prohibit time.

22. The method according to claim 20, wherein
said first protocol layer is a link layer (L2) comprising a link layer protocol,
said data unit handling device is arranged to receive data units conforming to said fink layer protocol over a communication link,
said communication link conforms to the standard of the universal mobile telecommunications system,
said feedback messages are universal mobile telecommunications system status messages, and
said feedback prohibit time is the value set for the universal mobile telecommunications system status prohibit timer.

23. The method according to claim 18, wherein a data release rate (RR) for releasing said plurality of data units over said release period (T) is determined on the basis of the number (NPR) of said plurality of data units to be released and the maximum release period ($T_M$).

24. The method according to claim 23, wherein said data release rate (RR) for releasing said plurality of data units over said release period (T) is equal to or larger than the value obtained by dividing the number (NPR) of said plurality of data units to be released by said maximum release period ($T_M$).

25. The method according to claim 24, wherein the data release rate (RR) for releasing said plurality of data units over said release period (T) is equal to or greater than the buffer fill rate (BFR).

26. The method according to claim 16, wherein the release of said data units conforming to said second protocol layer from said buffer is controlled in such a way that the individual data units of said plurality are released over said release period (T) longer than the period of time that would occur if all of the data units of the plurality were released instantly only if the number (NPR) of said plurality of data units to be released exceeds a predetermined threshold (Th), and are released instantly otherwise.

27. The method according to claim 16, wherein at least a part of said data units of said plurality of data units to be released over said release period (T) are released n at a time, n being an integer larger than one (1).

28. The method according to claim 16, wherein said first protocol layer is a link layer (L2) comprising a link layer protocol, and said data unit handling device receives data units conforming to said link layer protocol over a communication link.

29. The method according to claim 28, wherein said communication link is a wireless link and said link layer protocol is a protocol for controlling the transmission of data units over said wireless link.

\* \* \* \* \*

UNITED STATES PATENT AND TRADEMARK OFFICE
CERTIFICATE OF CORRECTION

PATENT NO.         : 7,573,908 B2  
APPLICATION NO. : 10/470225  
DATED                 : August 11, 2009  
INVENTOR(S)        : Meyer et al.

Page 1 of 1

It is certified that error appears in the above-identified patent and that said Letters Patent is hereby corrected as shown below:

In Fig. 4b, Sheet 4 of 11, delete " [$t_3$ $t_4$ $t_4$] " and insert -- [$t_3$ $t_4$ $t_5$] --, therefor.

In Column 8, Line 32, delete "10B" and insert -- 10b --, therefor.

In Column 11, Line 58, in Claim 5, delete "Fl" and insert -- FI --, therefor.

In Column 11, Line 59, in Claim 5, delete "Fl" and insert -- FI --, therefor.

In Column 13, Line 32, in Claim 19, delete "Fl" and insert -- FI --, therefor.

In Column 13, Line 33, in Claim 19, delete "Fl" and insert -- FI --, therefor.

In Column 14, Line 2, in Claim 22, delete "fink" and insert -- link --, therefor.

Signed and Sealed this

Seventeenth Day of November, 2009

David J. Kappos  
*Director of the United States Patent and Trademark Office*